June 11, 1946.  E. F. ZAP  2,402,001
CONTROL SYSTEM FOR AIRPLANES
Filed March 15, 1941    5 Sheets-Sheet 2
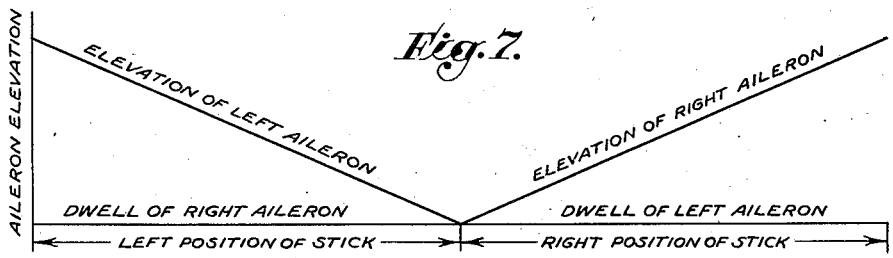
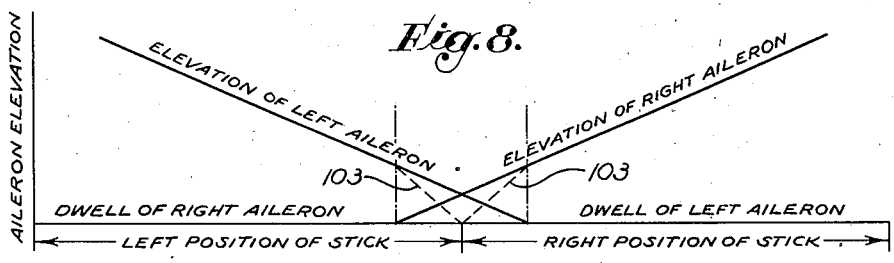
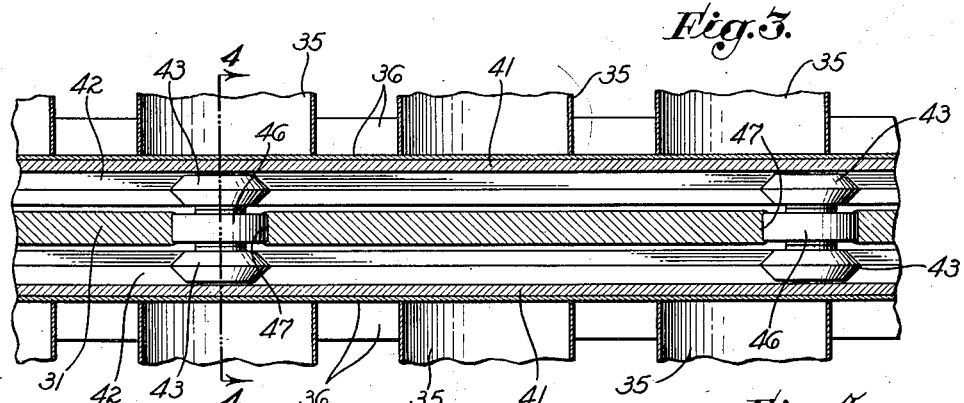
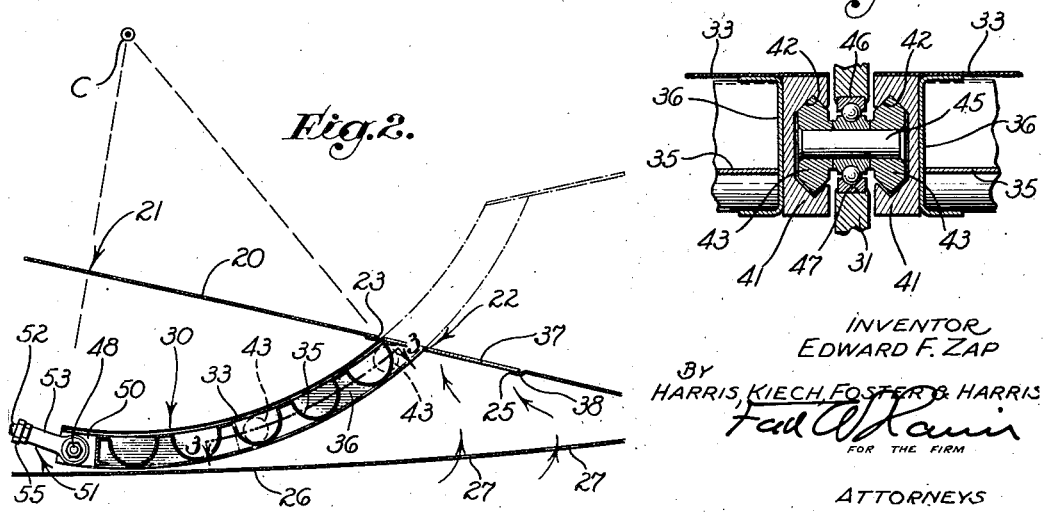
INVENTOR
EDWARD F. ZAP
BY HARRIS, KIECH, FOSTER & HARRIS
FOR THE FIRM
ATTORNEYS

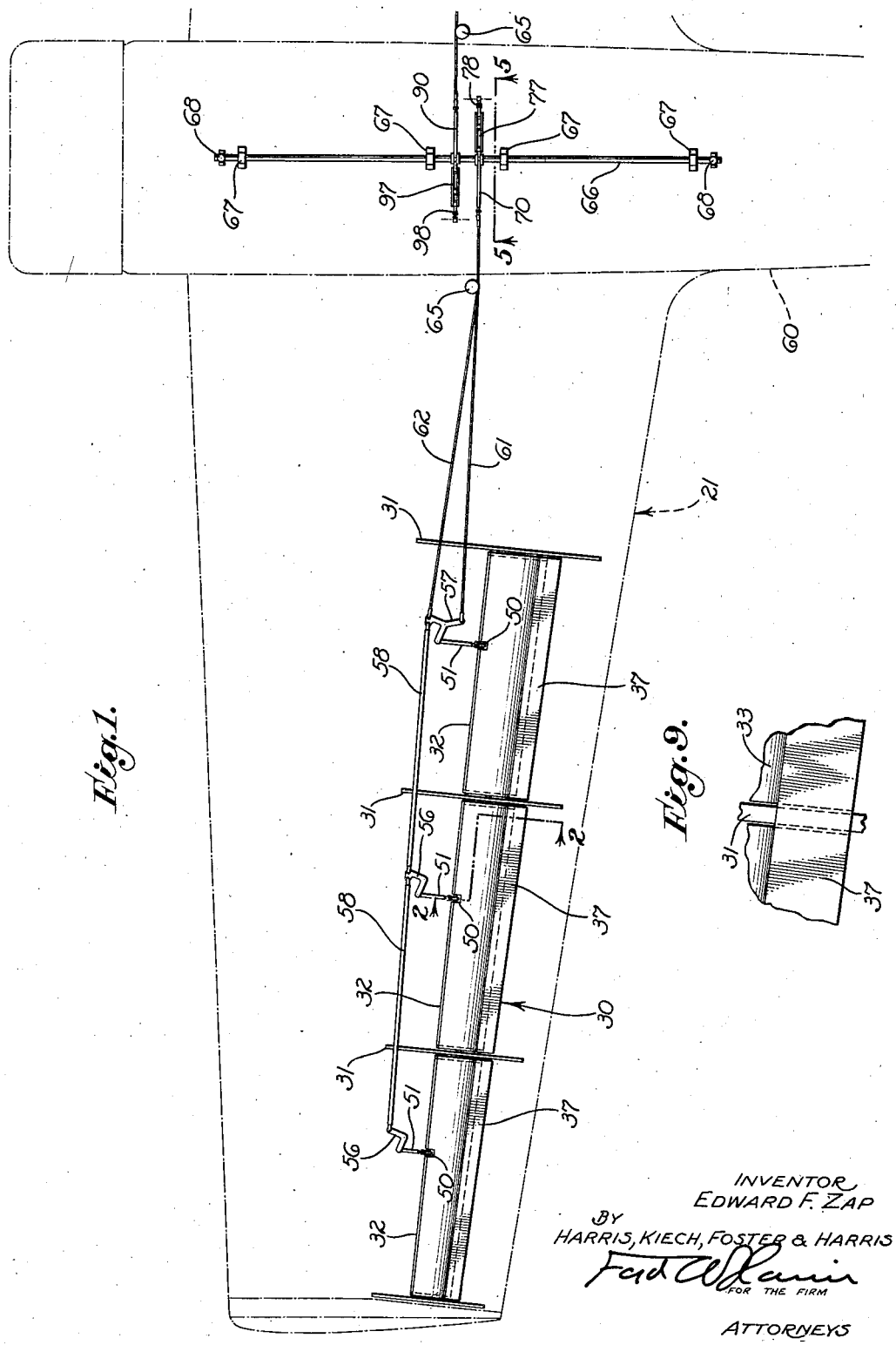

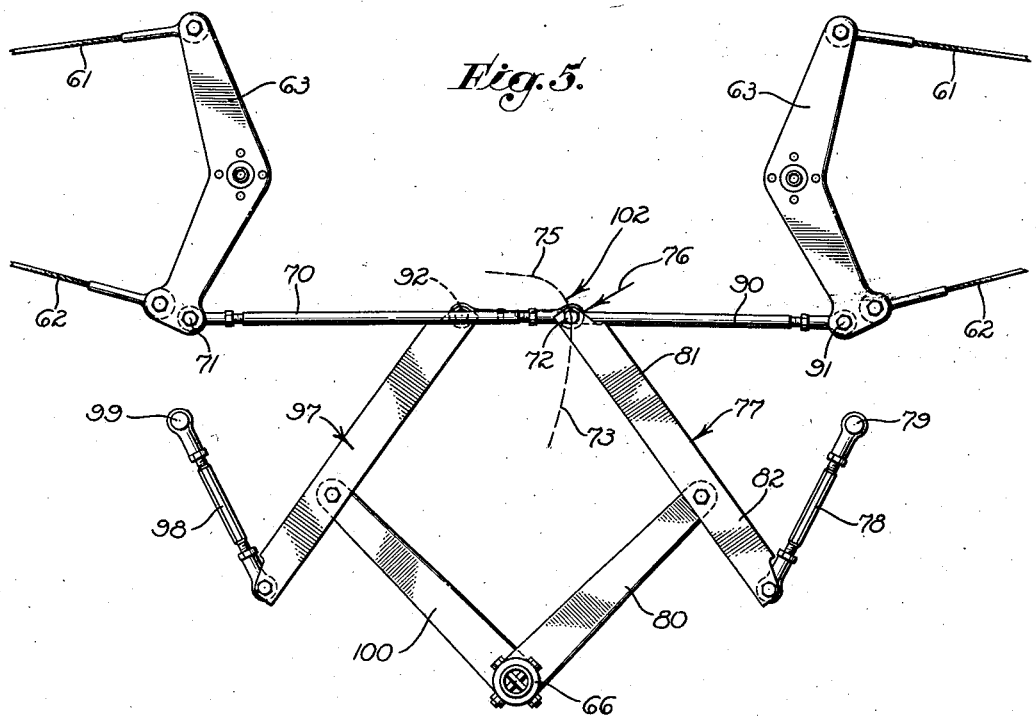

June 11, 1946.  E. F. ZAP  2,402,001
CONTROL SYSTEM FOR AIRPLANES
Filed March 15, 1941      5 Sheets-Sheet 4
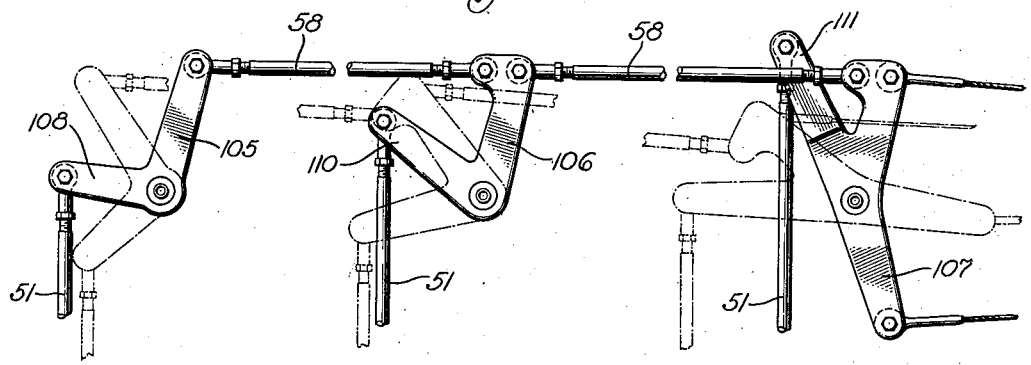
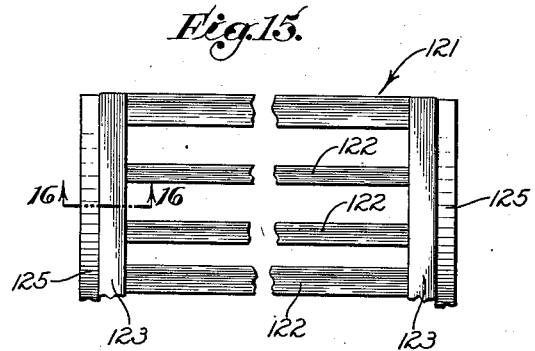
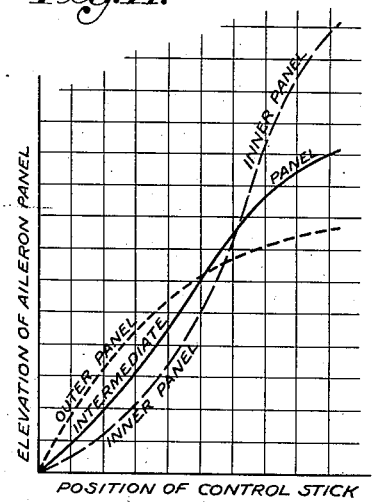
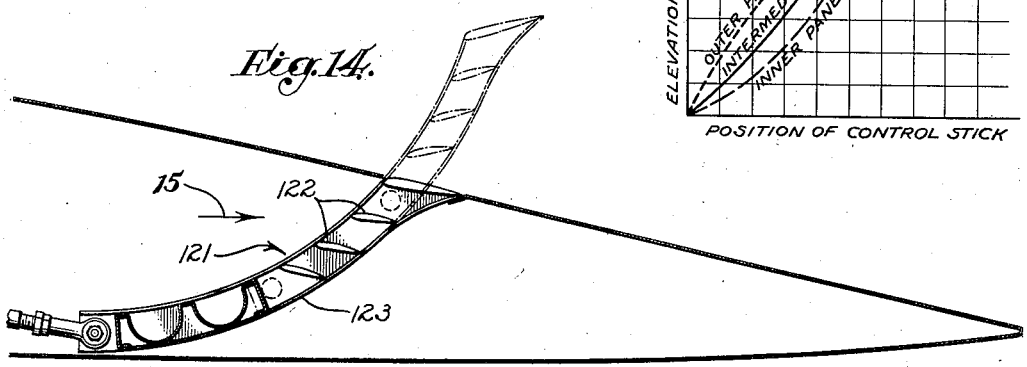
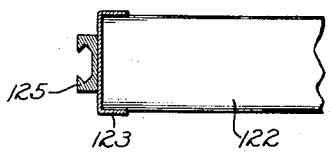
INVENTOR
EDWARD F. ZAP
BY
HARRIS, KIECH, FOSTER & HARRIS
ATTORNEYS

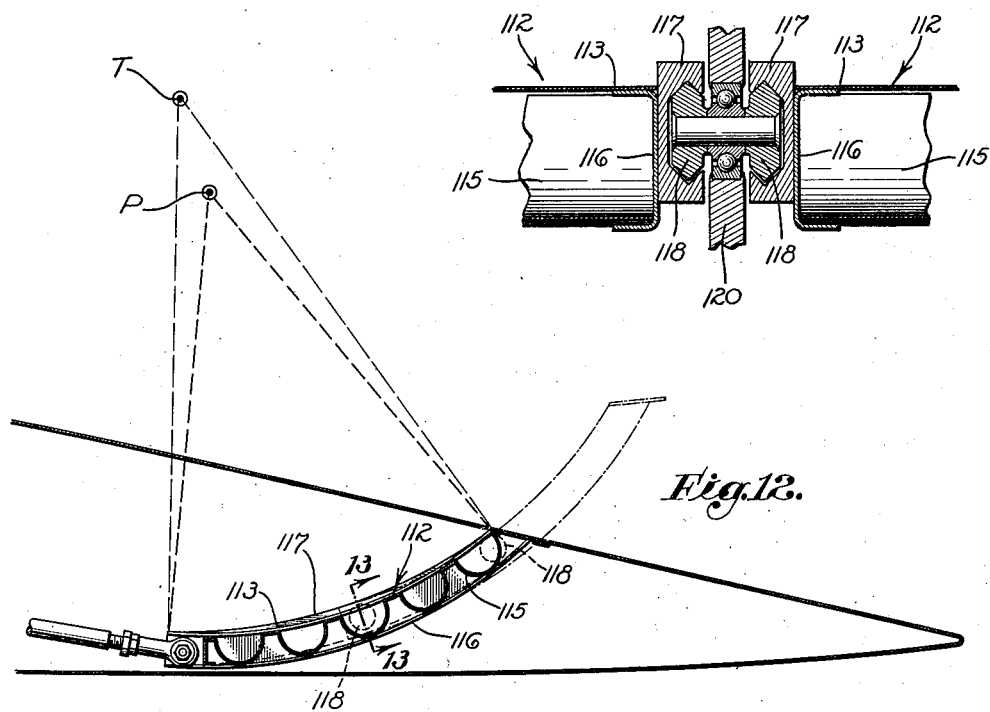
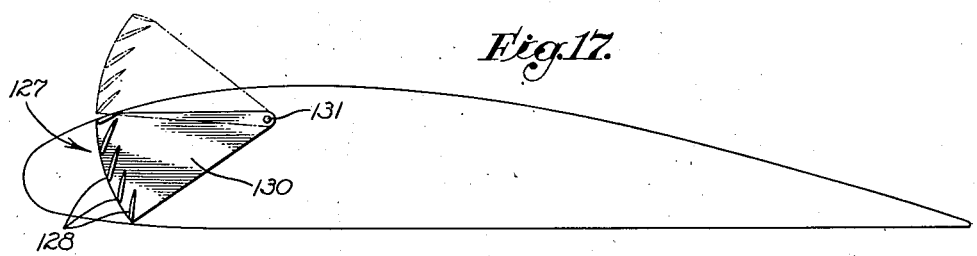
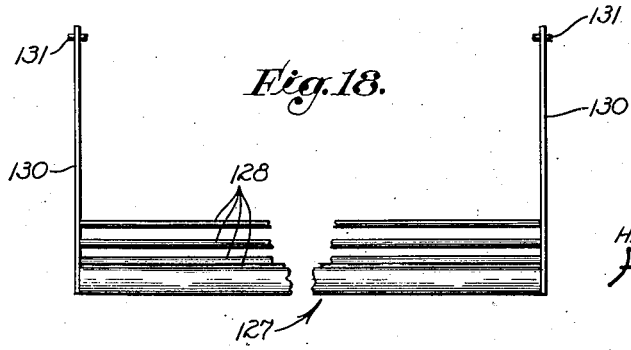

Patented June 11, 1946

2,402,001

UNITED STATES PATENT OFFICE 2,402,001

CONTROL SYSTEM FOR AIRPLANES

Edward F. Zap, Los Angeles, Calif.

Application March 15, 1941, Serial No. 383,570

3 Claims. (Cl. 244—90)

My invention relates to control system for pairs of aerodynamic members, such as pairs of ailerons or pairs of flaps, in which systems the two aerodynamic members have opposite flight-control effects and are both governed by a common means such as the usual control stick.

While the invention is broadly applicable to various control problems in aircraft operation, it is being initially applied to the control of a pair of ailerons of a particular type. The description herein of such an embodiment of the invention will be adequate guidance for applying the underlying principles of the invention to other flight-control systems.

The general object of the invention is to provide a positive, reliable, and sensitive control for a cooperating pair of aerodynamic members or ailerons.

In the rolling control of an aircraft by a pair of ailerons of the type herein disclosed, it is required that each aileron dwell or remain stationary at some stage while the other aileron is being moved by the common control stick. One object of the invention is to provide operative connections between the control stick and the two ailerons that will afford the requisite dwells in the operation of each aileron; and a further object is to incorporate in such operative connections suitable means to substantially lock the ailerons substantially in their dwell positions. A still further object is to make such operative connections reversible in the sense of transmitting to the control stick at least a portion of the aerodynamic forces encountered by the ailerons, thereby to make the aerodynamic forces perceptible to the pilot.

One problem encountered in designing a control system involving the present type as well as other types of ailerons is to achieve sensitivity of control immediately adjacent the neutral position of the control stick. In other words, it is required that the aircraft be definitely and instantly responsive to even minor lateral movements of the control stick from its normal neutral position. To have a central "dead" zone in the range of stick movement or even an appreciable zone of relatively low response is intolerable, especially in a modern military airplane. One object of the present invention is to achieve such sensitivity of control.

It is a further object of the invention to provide a relatively rapid rise of flight-control forces as the control stick initially departs in either lateral direction from its neutral position. It is proposed that the magnitude of the engendered flight-control forces increase progressively as the control stick swings laterally from its neutral position but that the magnitude initially increase at an accelerated rate.

A still further object of the invention is to provide an aileron-control arrangement that is not critical in adjustment and in which looseness of connections cannot develop a non-responsive zone in the range of control stick positions.

Other objects of the invention, especially specific objects relating to the mechanics of the control system and objects relating to novel forms of ailerons will be apparent in the following detailed description, taken with the accompanying drawings.

In the drawings which are to be considered as illustrative only:

Fig. 1 is a plan view of the control system as extended through one wing of an airplane, the outline of the wing and fuselage of the aircraft being shown in dash-dot lines;

Fig. 2 is an enlarged transverse section of a wing incorporating my control system, the section being taken as indicated by the broken line 2—2 of Fig. 1;

Fig. 3 is a greatly enlarged fragmentary section taken along the arcuate line 3—3 of Fig. 2;

Fig. 4 is a transverse section taken as indicated by the line 4—4 of Fig. 3;

Fig. 5 is an enlarged front elevation of a portion of the control system as viewed along the line 5—5 of Fig. 1, the control mechanism being in normal neutral disposition;

Fig. 6 is a similar view of the control mechanism at one of its operating positions.

Fig. 7 is a diagram of operation of one adjustment of the control system;

Fig. 8 is a diagram of operation of a second adjustment of the control system;

Fig. 9 is a fragmentary plan view showing a modification of the aileron construction;

Fig. 10 is a plan view on an enlarged scale of certain cranks that may be substituted in the arrangement shown in Fig. 1 in one practice of my invention;

Fig. 11 is a chart indicating the operations of the various aileron panels when the cranks of Fig. 10 are employed;

Fig. 12 is a view similar to Fig. 2 indicating the construction of a modified aileron arrangement;

Fig. 13 is an enlarged fragmentary cross section taken as indicated by the line 13—13 of Fig. 12;

Fig. 14 is a view similar to Fig. 2 showing another form of aileron panel that may be employed;

Fig. 15 is a fragmentary view taken as indicated by the arrow 15 in Fig. 14;

Fig. 16 is an enlarged fragmentary section taken as indicated by the line 16—16 of Fig. 15;

Fig. 17 is a diagrammatic view in section showing another form of aileron that may be employed; and Fig. 18 is a fragmentary plan view of the aileron shown in Fig. 17.

The particular aileron construction shown in the drawings offers superior flight-control effects in comparison with other ailerons and can be incorporated in wings that cannot be equipped with conventional ailerons. Some airplane wings, for example, have adjacent or at their trailing edges swingable or extensible flaps that preclude the installation of aileron panels of the usual type. The present ailerons operate at the upper surfaces of the wings and substantially forward of the trailing edges of the wings.

As indicated in Fig. 2, the upper skin 20 of a wing generally desigated 21 is provided with a spanwise aileron slot 22 having a forward edge 23 and a rearward edge 25. Preferably the lower skin 26 of the wing has one or more openings 27 into which air may flow as indicated by the arrows whenever the aileron slot 22 is open. It is contemplated that an aileron will be provided which in retracted disposition will substantially conform to the normal airfoil configuration of the wing 21 and at its effective or extended position will extend above the upper skin 20 of the wing, the aileron at its retracted disposition closing the aileron slot 22. It is apparent that various types and constructions of ailerons may be employed to function in substantially the manner described.

Lateral or rolling control of the aircraft by such an aileron arrangement is achieved both by spoiling lift in one wing and by additionally setting up positive downward reaction of the wing to the air stream. At high speed of flight the aileron is usually only slightly lifted for a control effect and functions primarily as a deflection obstacle in the air stream, the resultant eddies spoiling lift to a material degree and causing drag while simultaneously the reaction of the obstacle in deflecting the air stream results in a downward thrust on the wing. Both of these two effects cause a rolling moment and both create a favorable yaw. At lower speeds of flight the aileron is extended farther above the upper skin of the wing, but the most important factor in flight control at low speed may be the flow of air to the upper surface of the wing through the aileron slot 22.

The specific aileron 30 in Fig. 2, which is shown to be of arcuate cross-sectional configuration, is normally telescoped into the configuration of the wing 21 and is adapted to retractably extend upward from the wing through the aileron slot 22. Since the aileron slot 22 extends across the upper edges of various ribs 31 in the wing 21 (Fig. 1), the aileron 30 may comprise a number of sections or panels 32 dimensioned to fit into the wing compartments that are separated by the ribs. While the individual panels 32 are shown as structurally independent of the others in Fig. 1, it is apparent that they may be interconnected at their upper edges without interfering wtih the ribs 31.

As shown in the drawings, each of the panels 32 of the aileron 30 has a front skin 33, a corrugated reinfocement 35, channel-shaped side walls 36, and a trailing plate or deflection 37 at its upper edge. No rear skin on the opposite side of the reinforcement 36 is necessary. The trailing plates 37 are dimensioned to cover the aileron slot 22 when the aileron is completely retracted and at such time may overlie an offset lip 38 formed in the upper skin 20 of the wing. If the sections or panels 32 of the aileron are to be structurally interconnected, such interconnection may be provided by employing a single trailing plate 37 common to the various panels 32, as shown in Fig. 9. In addition to functioning as an effective part of the aileron in flight control, the trailing plate 37 has the function of serving as a deflection member, the railing plate reacting to the air stream by creating a desirable tendency on the part of the aileron to retract to its normal disposition.

The aileron panels 32 may be mounted in the wing 21 for extension and retraction in any suitable manner and may be arranged to move along arcuate paths concentric to the centers or axes of curvature of the aileron panels. In the particular construction shown in Figs. 2, 3, and 4, each aileron panel 32 has an arcuate track 41 mounted on each of its side walls 36, the arcuate track having a longitudinal channel 42 conforming to and engaged by suitable rollers 43. For each arcuate track 41 there are two of the rollers 43 mounted at spaced points on one of the ribs 31. The two rollers 43 have fixed axes of rotation but nevertheless guide the track 41 on a curved path through the aileron slot 22 since the track itself is curved. As best shown in Figs. 3 and 4, the two rollers 43 on one side of a rib 31 may be paired with the two rollers on the other side of the rib. The two paired rollers 43 are mounted on opposite ends of a pin 45 and the pin is carried by a roller bearing 46 mounted in an aperture 47 in the rib. To provide an operative connection for the actuation of each of the aileron panels 32, the inner spanwise edge of each aileron panel may be provided with a suitable wrist pin 48 set across a recess 50.

When the aileron 30 is shifted along its arcuate path through the aileron slot 22 into the air stream above the wing, it becomes an obstacle against which the air stream impinges with resultant pressure against the front skin 33 of the aileron. It has been ascertained empirically that such pressure on the front skin of the aileron does not have any significant component tending to retract the aileron if the aileron is guided in the above-described manner along a path concentric to its own curvature of cross-sectional configuration. In other words, if the center of curvature of the front skin 33 of the aileron panel is at C in Fig. 2 and if the center of curvature of the aileron track 41 is likewise at C, pressure of the air stream on the aileron panel will tend neither to extend nor retract the aileron panel at any position of the panel. It will be noted, however, that with increasing extension of the aileron, the trailing plate 37 intercepts the air stream at an increasing angle and results in a correspondingly increasing tendency of the aileron to retract.

It is apparent that an arcuate aileron movable on a concentric path in combination with a trailing plate or other equivalent deflection means provides an ideal aerodynamic member for flight control in that only a minor portion of the aerodynamic forces encountered by the flight-control member are transmitted through the control mechanism back to the control stick, and yet that force of minor magnitude which is perceptible to the pilot varies with the extension of the control member. Such an arrangement gives the pilot a "feel" of the control mechanism that is necessary for skillful flying and yet imposes no physical burden on the pilot even when large control areas are involved and flight is made at exceedingly high speed.

In the construction shown in the drawings, operative connection to each of the aileron panels 32 is provided by a connecting rod 51 that is preferably adjustable in effective length. Each of the connecting rods 51 may have an end portion 52 threaded into an eye member 53, the eye member embracing the previously-mentioned wrist pin 48. A lock nut 55 normally prevents relative rotation between the end portion 52 and the eye member 53.

The connecting rods 51 associated with the outer two aileron panels 32 are actuated by two corresponding bell-cranks 56, while the connecting rod 51 associated with the third or innermost aileron panel is operated by a three-arm crank 57, and the three cranks comprising the bell-cranks and the three-arm crank are operatively interconnected by two operating rods 58. Preferably the operating rods 58 are constructed for adjustment in effective length in the same manner as the connecting rod 51.

Since the particular wing 21 shown in plan in Fig. 1 is of tapered configuration and since I prefer to extend the ailerons at all wing stations in like proportion to the wing chords at the stations, I may give the aileron 30 a spanwise taper conforming to the spanwise taper of the wing. In my preferred construction, the overall configuration of the aileron 30 is that of a tapered longitudinal section of a cone. It is apparent that in the operation of such an aileron the throw of each of the connecting rods 51 must vary from the throw of the other two, the least throw being required for the connecting rod nearest the tip of the wing and the greatest throw being required in the connecting rod 51 nearest the fuselage 60 of the airplane. The required differences in throw are achieved by varying the relative dimension of the arms of the two bell-cranks 56 and of the three-arm bell-crank 57.

The second and third arms of three-arm cranks 57 may be connected by two cables 61 and 62 to corresponding arms of one of two bell-cranks 63 (Fig. 5) in the fuselage 60, the two cables being guided by various pulleys 65. Fig. 1 shows in the fuselage 60 a torque tube 66 journaled in bearings 67 and shows two control sticks 68 for optional use in rotating the torque tube. the torque tube and control sticks being of conventional construction. To complete the arrangement for controlling the ailerons 30 in the two wings of the aircraft, some means must be provided to operatively connect the torque tube 66 with the two large bell-cranks 63 in a manner to permit the required dwells in the operation of the two bell-cranks 63. The dwell in the operation of each of the bell-cranks 63 occurs whenever a control stick 68 moves past a point representing minimum retraction of the corresponding aileron 30. Thus, a maximum swing of a control stick 68 to the left to cause maximum extension of the left aileron must include substantial movement of the control stick after the right aileron is completely retracted, and such a maximum swing to the left is possible only if there is some provision for a dwell or lost motion in the operation of the right bell-crank 63.

While various expedients may be employed to provide the required lost motion in the operation of each of the bell-cranks 63, my preferred practice is characterized by the concept of employing a rotatable member such as an arm or link corresponding to each aileron 30 and arranging for movement of the control stick in lateral direction to be translated into either bodily shift or pivotal movement of the rotatable member according to whether the aileron is to operate or to dwell, the aileron being arranged to be operatively responsive only to the bodily shift of the rotatable member. Swinging of the control stick in a direction to retract one of the ailerons 30 is translated into bodily shifting of the rotatable member until the aileron is completely retracted and thereafter continued movement of the control stick in the same direction is translated into substantially solely pivotal movement of the rotatable member. During such pivotal movement the rotatable member serves as a positive lock to prevent movement of the aileron. To embody this conception I may employ a linkage such as shown in Figs. 1, 5, and 6, as will now be described.

For control of the left aileron 30, a link 70 has a first pivot 71 at one end operatively connected to one arm of the corresponding bell-crank 63 and has a second pivot 72 at its opposite end. When it is required that the left aileron pause or dwell in the course of the operation of a control stick 68, the second pivot 72 of the link 70 is guided in a path substantially concentric to the first pivot 71, and when it is required that the left aileron respond to movement of a control stick the second pivot 72 is guided in a path that is not concentric to the axis of the first pivot 71, the two paths meeting at a common transition point. Thus in Fig. 5, a dotted line 73 representing the concentric path and a dotted line 75 representing the non-concentric path of the second pivot 72 meet at a transition point designated by the arrow 76 to form a single curve representing the range of movement of the second pivot point 72.

The means I prefer to employ for operating and guiding the link 70 for the left aileron comprises the combination of a guide lever 77, a rocker member or anchoring link 78 mounted on a fixed pivot 79, and a radial arm 80 on the torque tube 66. The guide lever 77 is fulcrumed on the radial arm 80 and has one arm 81 pivotally connected to the second pivot 72 of the link 70, the other arm 82 being connected to the anchoring link 78.

For control of the right aileron 30, a linkage identical with that described above, but in reverse disposition, includes: a link 90 corresponding to the link 70, the link having a first pivot 91 and a second pivot 92; a guide lever 97 corresponding to the guide lever 77; an anchoring link 98 corresponding to the anchoring link 78 mounted on a fixed pivot 99; and a radial arm 100 corresponding to the radial arm 80. It is apparent that the second pivot 92 of the link 90 is guided through paths that are mirror images of the paths 73 and 75, the various paths of the second pivot 72 and the second pivot 92 forming two intersecting curves as indicated in Fig. 6.

The disposition of the various elements of the two linkages that is shown in Fig. 5 represents one possible adjustment of the control mechanism. The essence of this particular adjustment is that when a control stick 68 is in its neutral position, a condition represented by Fig. 5, the second pivot 72 of the link 70 is at the transition point 76 of its movement and the second pivot 92 of the link 90 is likewise at the corresponding transition point of its curve of movement. When one of the control sticks 68 is swung to the left, the various parts of the two linkages take the positions shown in solid lines in Fig. 6.

The manner in which the adjustment indicated by Fig. 5 causes the control system to function may be understood by referring to Fig. 7 in which the elevations of the two ailerons 30 are plotted against positions of a control stick 68. When the control stick is in a central neutral position relative to its range of lateral movement for rolling control of the airplane, both ailerons are at completely retracted positions. Since the second pivots of the two links 70 and 90 are respectively precisely at the transition point of their respective ranges of movement, and since lateral shifting of the control stick causes opposite movements of the two second pivots, it is apparent that any lateral movement of the control stick from its central neutral disposition causes one aileron to be substantially locked in its dwell position and causes the other aileron to be simultaneously extended to a degree controlled by the stick movement.

While this adjustment of the control mechanism, exemplified by Figs. 5 and 7, may be followed in some practices of my invention, certain disadvantages may be noted. Adjustment is critical and must be made with precision. If either or both of the second pivots of the links 70 and 90 are in a dwell position, i. e. on their concentric path of movement when the control stick is at neutral disposition, there will be a central "dead" zone of non-responsiveness in the range of control stick movement. Even after proper adjustment is attained, such a dead zone will become apparent if any backlash or looseness develops anywhere in the control linkage. If the aircraft, furthermore, offers little or no response to initial movement of an aileron from its completely retracted position, such a zone will exist, i. e., if an aileron having a range of ten inches of movement has little or no control effect in the first inch of movement from its retracted disposition, a dead zone will be apparent. Within a "dead" zone, the ailerons will not be sensed by the pilot through the control stick, the result of course being uneven flight control and the pilot continually sweeping the control stick from one side to the other of the dead zone.

In my preferred practice of the invention, I so adjust the operating linkage that each of the second pivots of the two links 70 and 90 is spaced from its transition point along its paths of non-concentric movement when a control stick is at the central neutral position. In other words, instead of placing the second pivot 72 of the link 70 at the transition point 76, as shown in Fig. 5, I prefer to place it at some point in the non-concentric path 75, for example, at the point indicated by the arrow 102. The second pivot 92 of the link 90 is, of course, at a corresponding position in its non-concentric path when the control stick is at neutral, the two ailerons in effect being balanced against each other through the control stick. The manner in which the control system operates under this preferred adjustment is indicated diagrammatically in Fig. 8.

The advantages to be found in this preferred arrangement are of considerable importance in practice. In the first place, the adjustment is not critical. In the second place, the fact that aerodynamic forces from both ailerons are transmitted simultaneously through the linkage to the control stick in a central zone of stick movement automatically compensates for any looseness that may develop in the mechanism. In the third place, the fact that both ailerons are normally slightly extended eliminates any sluggishness of control that might be attributable to non-responsiveness in the initial movement of an aileron from its completely retracted disposition. In the fourth place, control effects are accentuated in two small zones immediately adjacent the neutral position of the control stick, as indicated by the dotted lines 103 in Fig. 8. The dotted lines 103 represent the fact that if one aileron is extended while the other aileron is simultaneously retracted, the net effect is the extension of the first aileron at an accelerated rate. The only disadvantage in this preferred practice of my invention is in whatever penalty in aerodynamic efficiency resides in having an aileron normally extended to some degree. This penalty does not, however, offset the advantages especially if it is kept in mind in designing the wing and laying out the airfoil.

One practice of my invention is characterized by the concept of having the various aileron panels in a wing respond to the control stick at different rates. For example, a relatively large plane may have three aileron panels in each wing as indicated in Fig. 1 and the control linkage may be designed to cause the outermost aileron panel to respond relatively rapidly to initial stick movement from neutral, the other two panels responding less quickly. One advantage of such an arrangement in a large airplane or in an airplane having relatively extensive aileron panels is that it lightens the initial load on the control stick attributable to the inertia of the panels and therefore facilitates rapid stick movement. Another advantage is that the relatively rapid initial movement of the outermost panel makes the aircraft sensitive to the control stick to a desirable degree. In contrast, equal movement on the part of all three panels in response to initial movement of the control stick from neutral would impose a relatively large inertia load on the stick and would engender excessive control forces in response to relatively slight movement of the control stick from neutral.

The control mechanism shown in Fig. 1 may be changed to make this new mode of operation possible by changing the design of the two bell-cranks 56 and changing the design of the three-arm crank 57. By way of example, Fig. 10 shows such a new arrangement, the parts being shown as disposed at the neutral position of the control stick. A bell-crank 105 has been substituted for the outermost bell-crank 56 of Fig. 1, a bell-crank 106 has been substituted for the bell-crank 56 associated with the intermediate panel in Fig. 1, and a three-arm crank 107 has been substituted for the three-arm crank 57 of Fig. 1. The three cranks 105, 106, and 107 are connected to the three corresponding aileron panels 32 by the previously described connecting rods 51 and are interlocked by the two previously described operating rods 58.

The outermost bell-crank 105 has an operating arm 108 pivotally connected to the corresponding connecting rod 51 and it is important to note that the normal angle of the operating arm relative to the connecting rod 51 is near to or comparable to 90° so that the initial ratio of rotary movement of the operating arm to the transmitted longitudinal movement of the associated link 51 is nearly maximum. As the operating arm 108 rotates counter-clockwise to extend the outermost aileron, the ratio drops. The bell-crank 106 for the intermediate aileron panel has a longer operating arm 110 since in a tapered wing a greater range of movement is desired on the part of the intermediate panel than on the part of the outermost panel. It will be noted that the normal angle of the operating arm 110 relative to the associated connecting rod 51 is substantially less than the 90° angle of maximum effect, but the normal disposition of the arm is such that the ratio of arm rotation to the ratio of transmitted longitudinal movement of the connecting rod increases as the control stick departs from normal position. Finally, the three-arm crank 107 has an operating arm 111 longer than the operating arm 110 and normally disposed at a lesser angle than the operating arm 110. Initial movement of the operating arm 111 causes relatively little longitudinal movement of the corresponding connecting rod 51, but the ratio increases sharply after substantial movement of the control stick.

The manner in which the construction of the control mechanism indicated by Fig. 10 will cause the three panels in the wing to respond to movement of the control stick is represented by the three curves in Fig. 11 in which the elevations of the panels are plotted for various positions of the control stick. Fig. 10 clearly reflects the fact that initial movement of the control stick from neutral position causes prompt and extensive movement of the outer panel but only sluggish and relatively slight movement on the part of the other two panels. As the control stick swings farther from neutral position, first the intermediate panel is accelerated, and, finally, the inner panel is accelerated. In my preferred adjustment of the control mechanism, all of the panels reach maximum elevation substantially simultaneously as the control stick reaches its limit operating position. The different heights of the curve in Fig. 11 reflect the fact that in the tapered wing the panels reach various elevations at their maximum positions. While the outermost panel has the least range of extension in a wing of tapered planform, it is to be noted that by virtue of the relatively great distance of the panel from the longitudinal axis of the airplane, the panel is exceptionally effective in proportion to its area.

Aileron panels of various constructions and configurations may be employed in the different practices of my invention. I prefer, however, to employ panels of curved configuration that extend and retract on curved paths because such panels have unique advantages. One important advantage is that a curved panel affords the designer control over the proportion of air pressure on the face of the panel that is transmitted to the control mechanism. Another advantage is that a curved panel may be designed to retract into a wing space of relatively shallow depth. A further advantage is that for a given volume of available space in a wing, the panel may be relatively extensive in fore-and-aft dimension, a substantial extent of the panel remaining in the wing for anchorage at the extreme operative position of the panel. It is to be further noted that designing a panel with a radius of curvature outside the wing makes it possible to avoid disposing the forward face of the panel at an acute angle to the upper skin of the wing when the panel is extended. An acute angle as distinguished from an obtuse angle provides a trap in which snow and ice may accumulate.

One manner in which the designer may control the tendency of the panel to shift in response to pressure from the air stream is exemplified by the panel arrangement in Fig. 2 as heretofore discussed. Since both the panel and the track in Fig. 2 are concentric to the same axis of curvature, air pressure on the front skin of the panel creates no tendency whatsoever for the panel to shift and the designer achieves a retracting force of whatever magnitude is desired by simply adding a deflection plate 37 of a required area and angular disposition.

A second method of providing a force tending to shift the panel is to shape the panel and the guide track to different curvatures. In other words, a force component tending to shift the panel may be engendered by making the panel curvature eccentric to the curvature of the associated track. If the curvature of the panel is modified to place its axis of curvature rearward or toward the trailing edge of the wing from the axis of curvature of the track, pressure of the air stream on the exposed face of the panel will tend to retract the panel; conversely, if the axis of curvature of the panel is shifted to a position forward of the axis of curvature of the track, pressure of the air stream on the exposed face of the panel will tend to extend the panel.

Figs. 12 and 13 illustrate a panel arrangement in which the tendency of the panel is to retract in response to air pressure on the exposed face of the panel. Each of the aileron panels generally designated 112 has a front skin 113, a corrugated reinforcement 115, and a pair of side plates 116. The side plates 116 are attached to curved tracks 117 of the character heretofore described, each of the tracks engaging spaced rollers 118 mounted on a wing rib 120. The axis of curvature of the panel face is located, for example, at the point P which is substantially rearward of the axis of curvature T of the track. Increasing the rearward spacing of the axis P relative to the axis T increases the tendency of the extended panel to retract in response to air pressure from the air stream.

It has been definitely established by wind tunnel tests that if an aileron of the type shown in Figs. 2 and 12 or an aileron of any conventional type is mounted for operation at the upper surface of a wing forward of the 80% point on the wing chord, there will be a lag in the response of the aircraft to elevation of an aileron. The lag increases with any change in the position of the aileron forward from the 80% point. Even a very slight lag in response is intolerable for adequate flight control especially in military aircraft. I have discovered that the lag in response is caused by a vacuum effect engendered rearward of the aileron when the aileron is extended above the upper skin of the wing, and I have further discovered that the lag may be eliminated by providing for passage of air directly through the aileron. Various perforated, apertured, or slotted panels may be employed when it is desirable to place the aileron forward of the 80% point. My preferred aileron for a forward position comprises a plurality of spaced spanwise vanes which may or may not be arranged in curved alignment.

Figs. 14, 15, and 16 indicate by way of illustration the construction of a panel generally designated 121 that may be employed at any point on the upper surface of a wing forward of the 80% point. The panel 121 comprises a plurality of spaced spanwise vanes 122 mounted in a frame that includes a pair of channel-shaped side members 123, the side members preferably but not necessarily being of curved configuration. Each of the curved side members 123 may be attached to a curved track 125 to permit the panel to be extended and retracted in the manner heretofore described. The plurality of spaced vanes 122 not only define ample slots for air flow through the aileron but also provide numerous deflection surfaces to the air stream. These deflection surfaces engender the required flight-control forces for rolling the plane about its longitudinal axis and also provide a desired tendency for the aileron to retract into the wing.

Figs. 17 and 18 show an aileron panel generally designated 127 constructed for operation near the leading edge of the wing. The aileron 127 comprises a plurality of spaced spanwise vanes 128 mounted on a frame that includes a pair of triangular side plates 130, the side plates being mounted on pivots 131. Pivotal movement of the aileron 127 in response to the aileron control mechanism shifts the plurality of vanes 128 upward to the exterior of the wing as required for flight control.

My disclosure in specific detail of various constructions as examples of the invention will suggest various modifications and substitutions within the scope of my underlying concept, and I reserve the right to all such departures from the described embodiment of my invention that properly come within the scope of the appended claims.

I claim as my invention:

1. In an aircraft control system the combination of two opposite aerodynamic members; a common manual control member; and a linkage operatively connecting said control member to one of said aerodynamic members to provide a dwell in the movement of said one of the aerodynamic members while the other of the aerodynamic members is being moved by the control member, said linkage including a link having a first pivot and a second pivot, said first pivot being operatively connected to said aerodynamic member to operate the aerodynamic member when the first pivot is shifted laterally, a lever, said lever having a first arm and a second arm, said first arm being operatively connected with said second pivot of said link, means operatively interconnecting said manual control member and the second arm of said lever to cause said last connection to shift when the manual control member is moved, and a rocker member having a fixed pivot, said lever being fulcrumed on said rocker member, said link, lever, and rocker member being so constructed and arranged that over a portion of the range of operation of the linkage by said manual control member said second pivot of said link moves in a path substantially concentric to the axis of said first pivot of the link, and over the rest of the range of operation of the linkage said second pivot of said link moves in a path non-concentric to the axis of said first pivot of the link.

2. A linkage as set forth in claim 1 in which said means operatively interconnecting said manual control member and the second arm of said lever includes a rocker arm on which said lever is mounted.

3. In an aircraft control system the combination of two opposite aerodynamic members; a common manual control member; and two linkages operatively connecting said control member to said aerodynamic members to provide a dwell in the movement of each of the aerodynamic members while the control member is being moved, each of said linkages including a link having a first pivot and a second pivot, said first pivot being operatively connected to the corresponding aerodynamic member to operate the corresponding aerodynamic member when the first pivot is shifted, a lever, said lever having a first arm and a second arm, said first arm being operatively connected with said second pivot of said link, means operatively interconnecting said manual control member and the second arm of said lever to cause said last connection to shift when the manual control member is moved, and a rocker member having a fixed pivot, said lever being fulcrumed on said rocker member, said lever, link, and rocker member being so constructed and arranged that over a portion of the range of operation of the linkage by said manual control member said second pivot of said link moves in a path substantially concentric to the axis of said first pivot of the link to cause the corresponding aerodynamic member to dwell at one of its limit positions, said link, lever, and rocker member being so disposed that the corresponding aerodynamic member is at an intermediate position in its range of effective positions when said manual control member is at its neutral control position.

EDWARD F. ZAP.